United States Patent [19]

Yamada

[11] Patent Number: 5,061,886
[45] Date of Patent: Oct. 29, 1991

[54] APPARATUS FOR CONTROLLING MOVEMENT OF RECIPROCATING MEMBER, HAVING DATA DISPLAY CAPABLE OF INDICATING ENCODER SIGNAL INDICATIVE OF THE MOVEMENT

[75] Inventor: Minoru Yamada, Aichi, Japan

[73] Assignee: Brother Kogyo Kabushiki Kaisha, Aichi, Japan

[21] Appl. No.: 489,554

[22] Filed: Mar. 7, 1990

[30] Foreign Application Priority Data

Mar. 10, 1989 [JP] Japan ............................. 1-27679[U]

[51] Int. Cl.⁵ ............................................. G05B 23/02
[52] U.S. Cl. ..................................... 318/565; 318/603
[58] Field of Search ................ 318/565, 568.25, 602, 318/605, 652, 653, 569, 590, 600, 603

[56] References Cited

U.S. PATENT DOCUMENTS

| | | | |
|---|---|---|---|
| 3,916,571 | 11/1975 | Seidel | 318/578 X |
| 3,987,283 | 10/1976 | Moeller | 318/563 X |
| 4,317,176 | 2/1982 | Saar et al. | 318/434 X |
| 4,353,019 | 10/1982 | Sweeney, Jr. | 318/594 |
| 4,639,653 | 1/1987 | Anderson et al. | 318/599 |
| 4,674,928 | 6/1987 | Lyman | 318/568 X |
| 4,823,061 | 4/1989 | Boulton et al. | 318/603 |

Primary Examiner—Bentsu Ro
Attorney, Agent, or Firm—Oliff & Berridge

[57] ABSTRACT

Apparatus for controlling a reciprocating movement of a reciprocating member over a predetermined operating stroke by forward and reverse rotations of a drive motor. The apparatus includes an encoder for generating pulses each corresponding to an incremental distance of movement of the reciprocating member, and an operator's control panel having a plurality of operator's control switches for entering data and commands for controlling the drive motor, and a data display normally placed in a display mode for displaying information, a motor controller for controlling the drive motor according to the entered data and the encoder pulses. A detector is provided for detecting a specific command generated by the control switch or switches. The display is controlled by a display controller such that upon detection of the specific command by the detector, the display is placed in an inspection mode for providing an indication as to whether the encoder pulses are present or not.

13 Claims, 18 Drawing Sheets

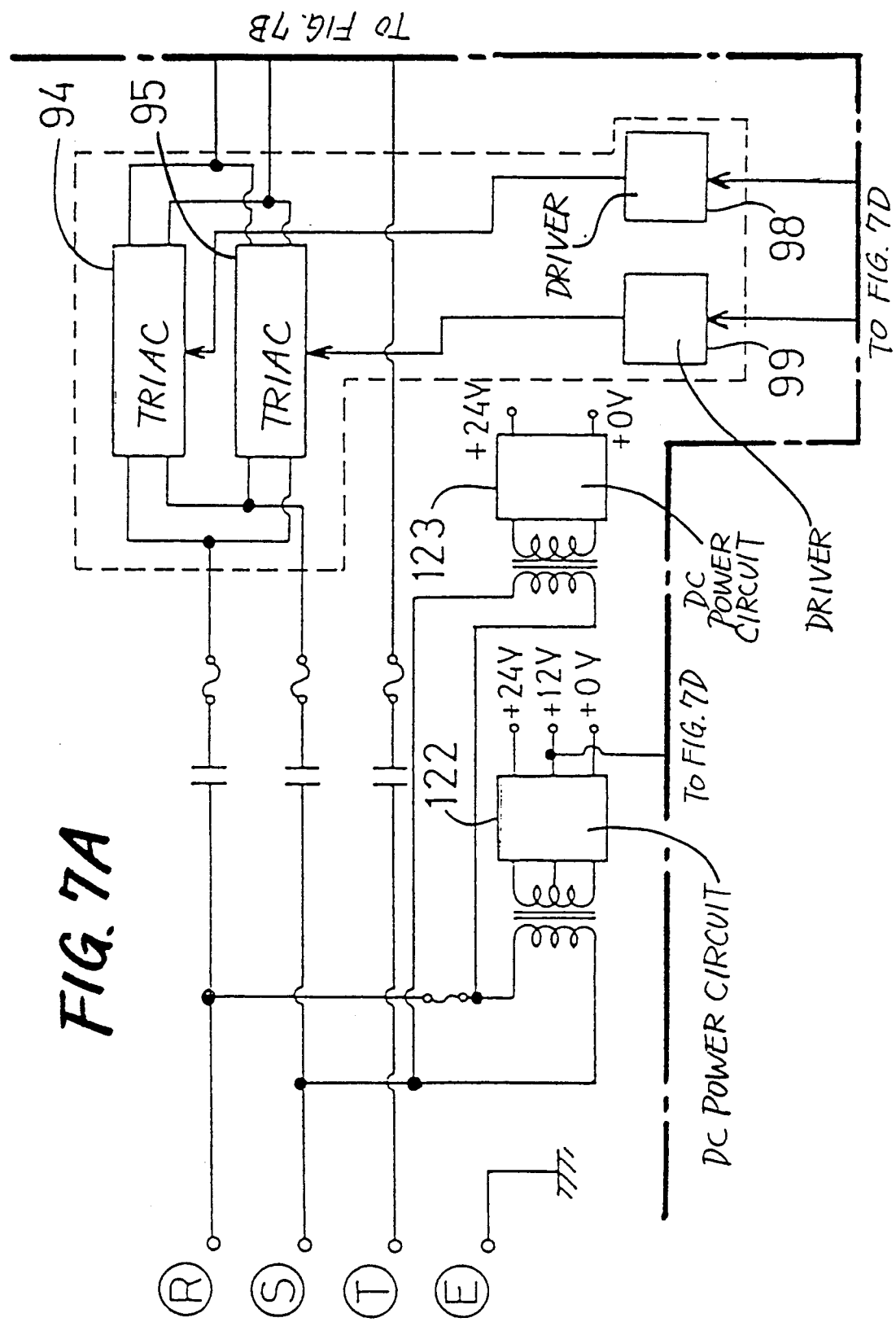

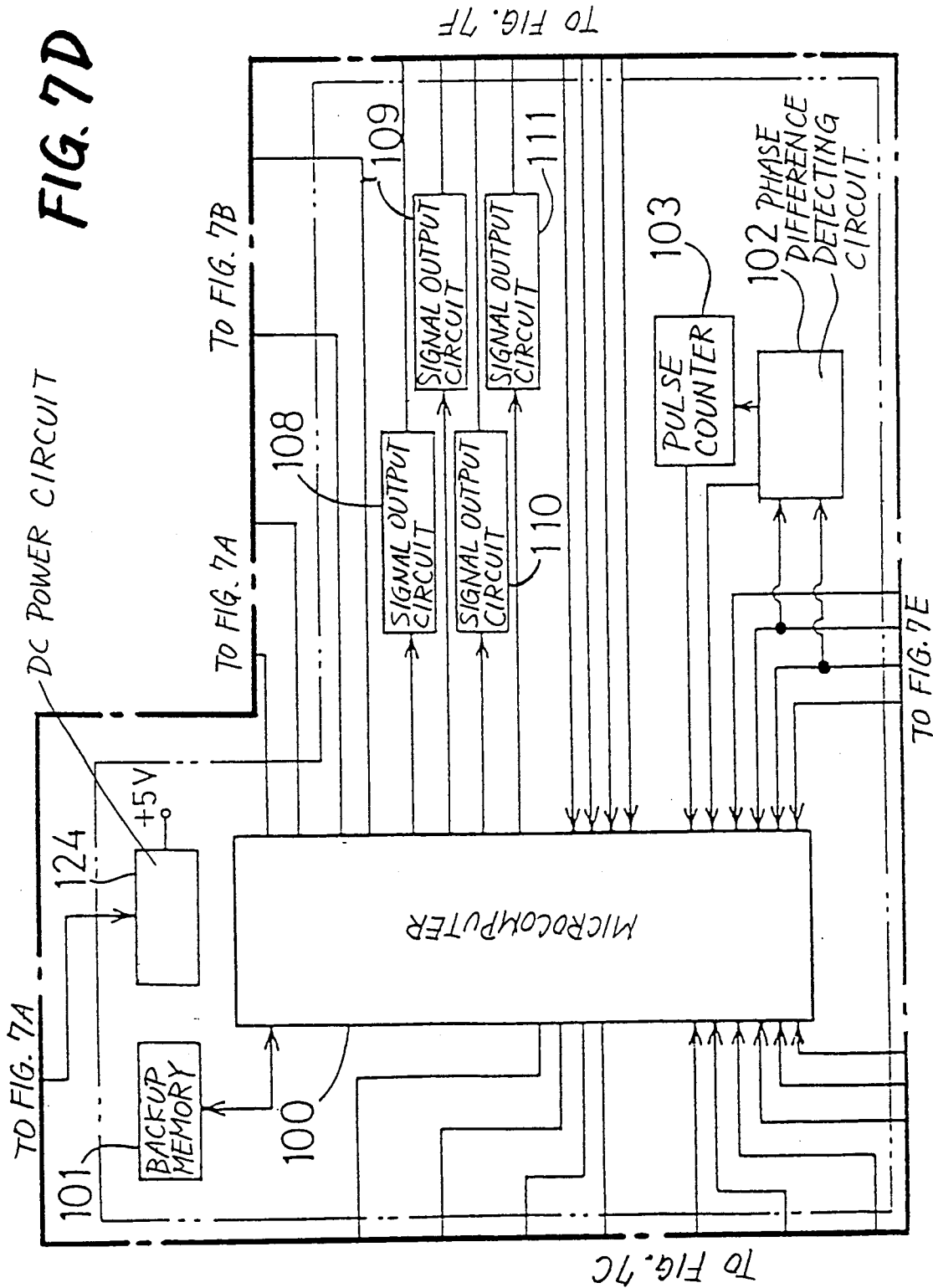

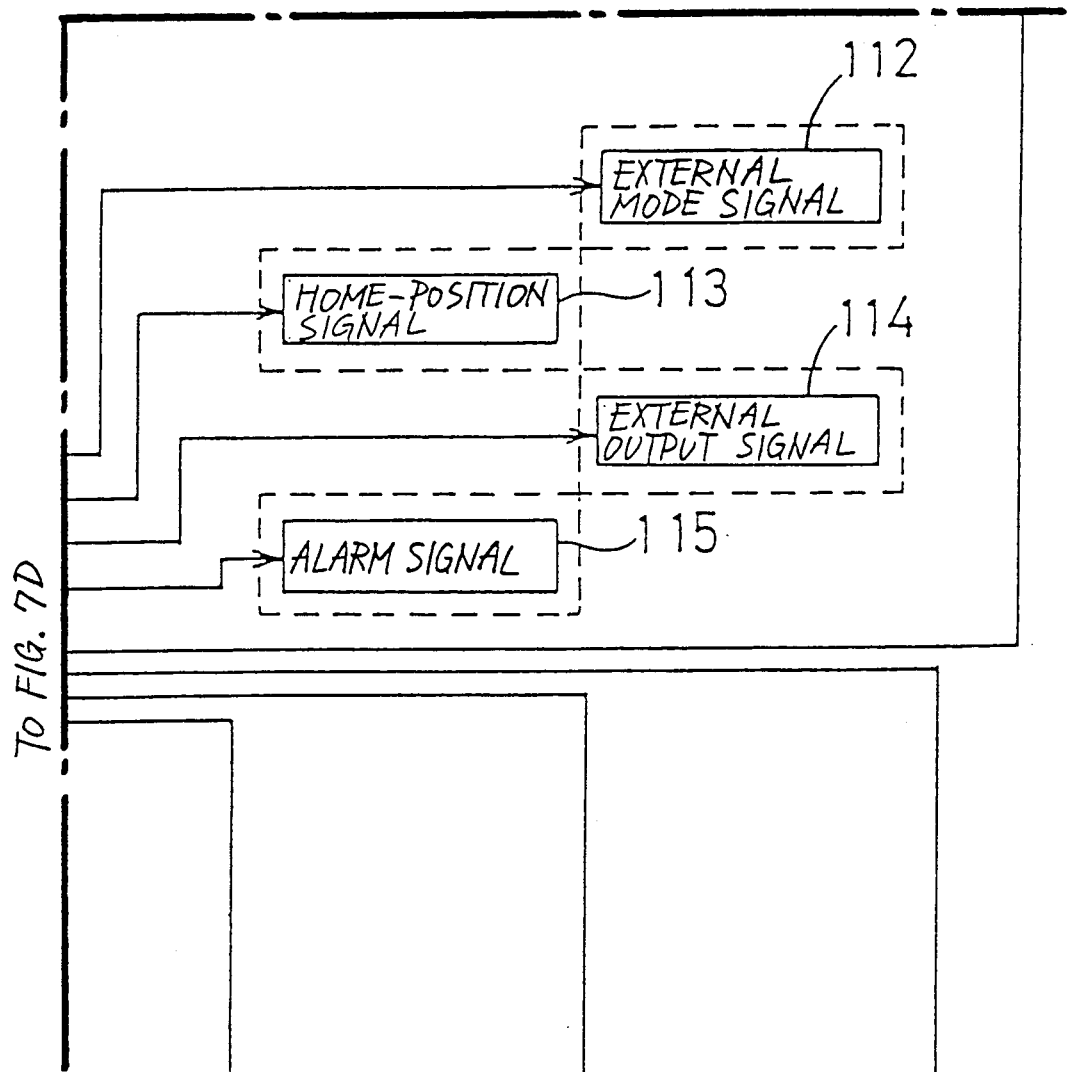
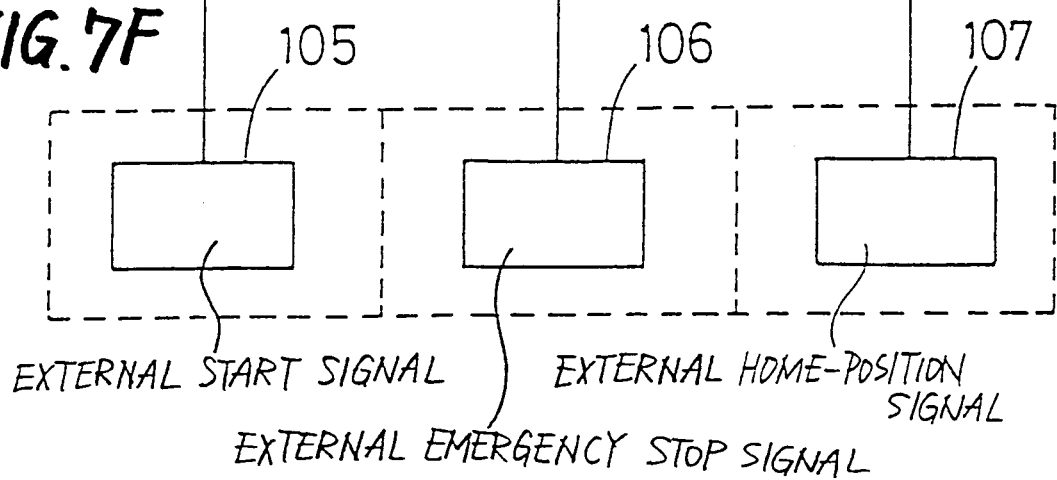
FIG. 7F

FIG. 8
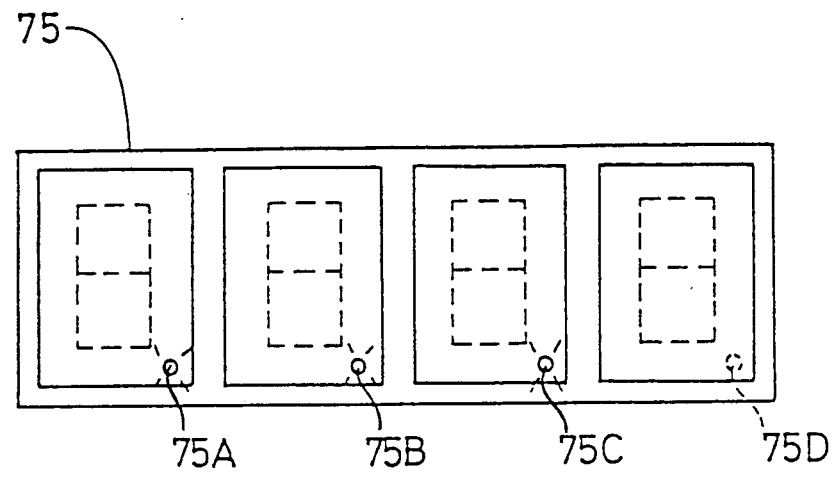
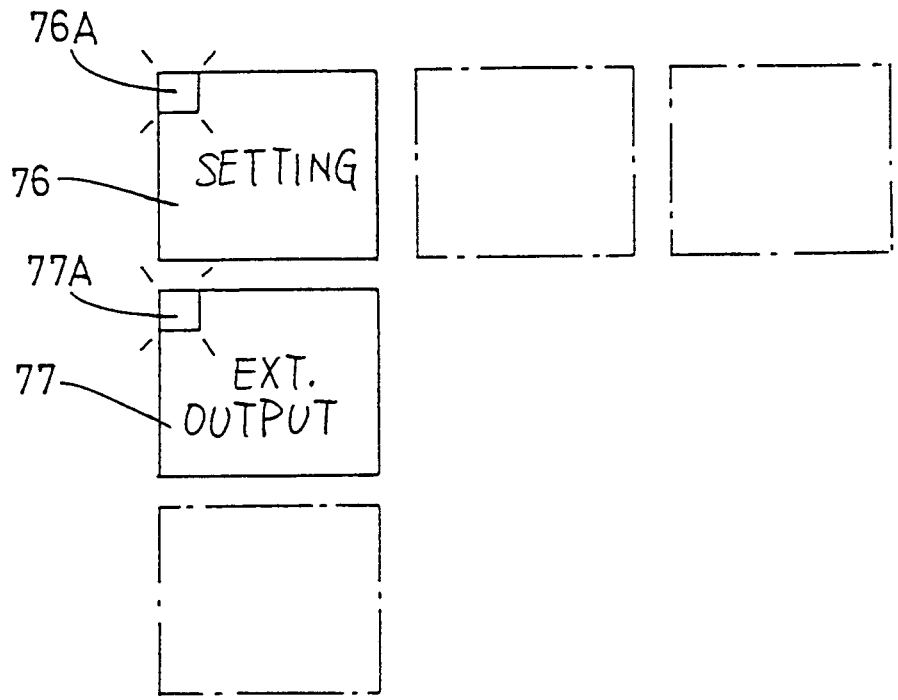

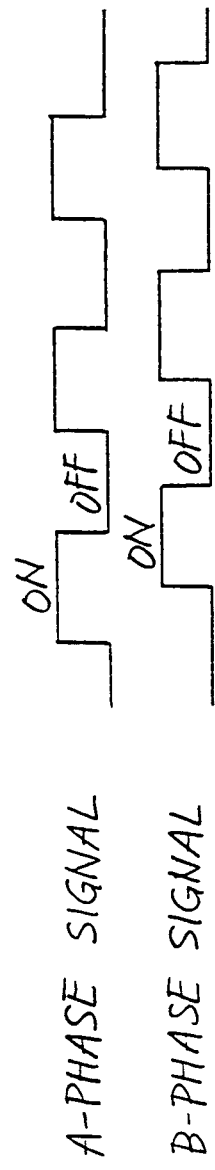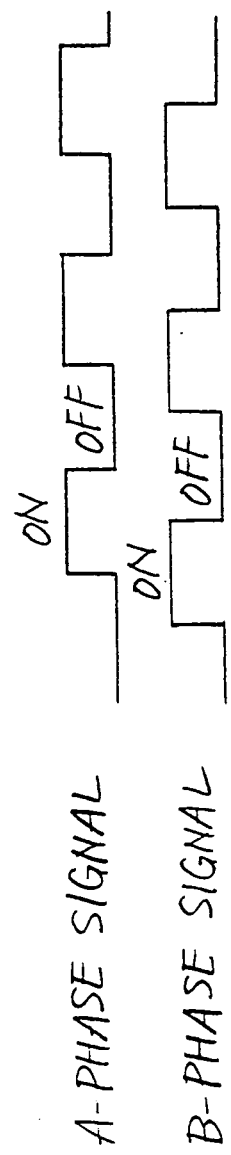

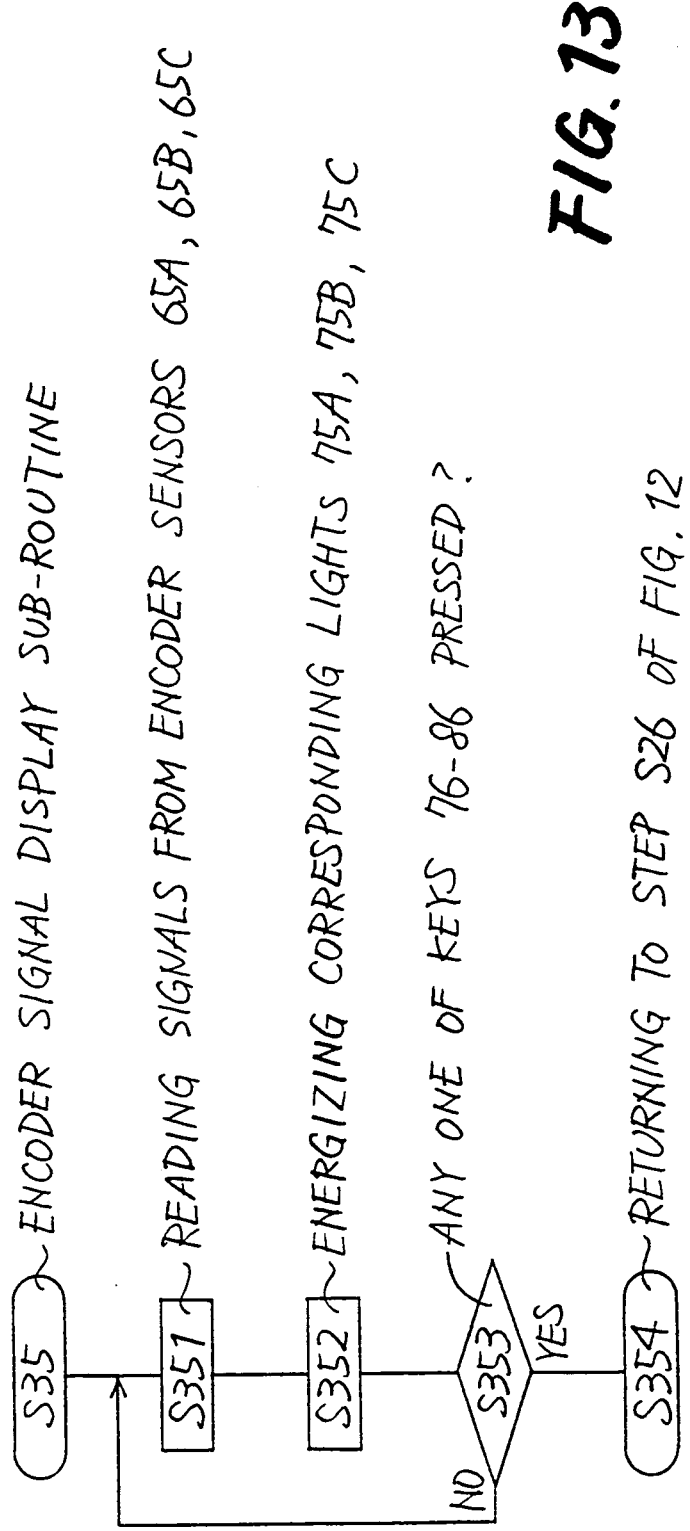

APPARATUS FOR CONTROLLING MOVEMENT OF RECIPROCATING MEMBER, HAVING DATA DISPLAY CAPABLE OF INDICATING ENCODER SIGNAL INDICATIVE OF THE MOVEMENT

BACKGROUND OF THE INVENTION

1. Field of the Invention

The present invention relates to an apparatus for controlling a reciprocating movement or operating stroke of a reciprocating member, such as a reciprocating spindle quill of a tapping or similar machine tool.

2. Discussion of the Prior Art

The control apparatus used for such a reciprocating member is usually adapted to detect and control the reciprocating movement of the reciprocating member, according to a signal generated by a relatively simple encoder. In a tapping machine, for example, the spindle quill is operatively connected to a spindle drive motor, so that the quill is fed in the forward tapping direction and retracted in the reverse direction, in synchronization with the forward and reverse operations of the drive motor. The operating stroke of the spindle quill is controlled by counting the number of pulses generated by the encoder after the spindle drive motor is started to operate in the forward direction. When the count of a counter used for counting the encoder pulses reaches a predetermined value, the operating direction of the motor is reversed, to retract the spindle quill from the lower end of the stroke to the home position of the machine, i.e., the upper end of the stroke.

The encoder is one of the important components of the control apparatus, and is conventionally incorporated within the spindle head of the machine and protected by a suitable covering member. The encoder is mounted on an encoder substrate, on which light-emitting diodes LED) are provided to permit the use to inspect the pulse signals produced by the encoder. When the visual inspection of the pulse signals is effected, the covering member must be removed to obtain an access to the light-emitting diodes.

In the conventional arrangement of the encoder and the inspection diodes, the maintenance or adjustment of the encoder which requires the removal of the covering member is cumbersome and time-consuming. The machine may fail to normally operate in connection of the reciprocating movement of the spindle quill, due to a defective or abnormal condition of the encoder. In particular, the encoder may fail to normally function, since the photoelectric detector of the encoder is exposed to oil and dust. Accordingly, the encoder should be inspected at suitable maintenance intervals, for assuring reliable operation of the machine.

SUMMARY OF THE INVENTION

It is therefore an object of the present invention to provide a control apparatus for controlling the operating stroke of a reciprocating member of a machine according to pulses from an encoder, which permits easy inspection of the encoder pulses by utilizing an operator's control panel usually provided for the machine.

The above object may be attained according to the principle of the present invention, which provides an apparatus for controlling a reciprocating movement cf a reciprocating member adapted to be reciprocated over a predetermined operating stroke by forward and reverse rotations of a drive motor, the apparatus comprising: (a) an encoder for generating pulses each of which corresponds to an incremental distance of movement of the reciprocating member; (b) an operator's control panel having a plurality of operator's control switches for entering data and commands for controlling the drive motor, and a data display normally placed In a data display mode for displaying information such as a distance of movement of the reciprocating member; (c) motor control means for controlling the drive motor according to the data entered through the control switches and the pulses generated by the encoder; (d) detecting means for detecting a specific command generated by at least one of the plurality of control switches on the operator's control panel; and (e) display control means responsive to the specific command detected by the detecting means, for placing the data display in an inspection mode for providing an indication as to whether the pulses of the encoder are present or not.

In the control apparatus of the present invention constructed as described above, the data display is placed in the inspection mode upon detection of a specific command generated by the operator's control panel. In this mode, the generation of the pulses by the encoder are indicated on the display on the operator's control panel, to permit the operator to visually inspect the encoder for normal functioning, without obtaining an access to the encoder as required in the conventional arrangement. Further, since the data display normally placed in the data display mode is utilized, the operator's control panel does not require an extra space for providing an exclusive indicator or display for inspecting the encoder for normal generation of the pulses.

The operator's control panel may be adapted to generate the specific command when a plurality of switches of the plurality of operator's control switches are concurrently operated. Where the plurality of operator's control switches comprise a plurality of mode selector switches including a data setting selector key for establishing a data setting mode for entering data such as data representative of the predetermined operating stroke of the reciprocating member, the specific command may be generated when the plurality of switches are operated in the data setting mode. One of the switches to be concurrently operated may be the data setting selector key.

The specific command for establishing the inspection mode of the data display may be generated when the two or more control switches on the operator's control panel are concurrently operated for at least a predetermined length of time, for example, at least three seconds.

The data display may include a plurality of alpha-numeric indicator elements which are operable in the data display mode, and a plurality of indicator lights corresponding to the alpha-numeric indicator elements, the indicator lights being selectively illuminated to indicate a position of a decimal point when a numerical value is indicated by the alpha-numeric indicator elements in the data display mode. In this case, the display control means may control at least one of the indicator lights of the data display in the inspection mode, such that each of the at least one indicator light is turned on and off depending upon whether the pulses generated by the encoder are present or not. The encoder may be adapted to generate an A-phase signal and a B-phase signal which have a same pulse interval corresponding to the incremental distance of movement of the reciprocating member and whose phases are shifted from each other, and a home-position signal which is generated when the reciprocating member is located at a home position thereof which defines one end of the predetermined operating stroke of the reciprocating member. In this instance, the display control means controls three lights of the indicator lights of the data display in the inspection mode, which three lights correspond to the A-phase, B-phase and home-position signals generated by the encoder.

The present control apparatus is suitably used for controlling a tapping machine which has a spindle for holding a tapping tool. The spindle is rotatably supported by a reriprocable spindle quill operatively connected to the drive motor.

BRIEF DESCRIPTION OF THE DRAWINGS

The above and other objects, features and advantages of the present invention will become more apparent by reading the following description of a presently preferred embodiment of the invention, when considered in connection with the accompanying drawings, in which:

FIGS. 7A–7F, is a block diagram showing one embodiment of a control apparatus of the present invention adapted to control the tapping machine of FIG. 1;

FIG. 8 is a view showing details of part of a data display provided on an operator's control panel of the machine;

FIGS. 9 and 10 are views showing waveforms of signals generated by the rotary encoder; and FIGS. 11–13 are flow charts illustrating a machine control operation of a microcomputer of the control apparatus of FIG. 7.

DETAILED DESCRIPTION OF THE PREFERRED EMBODIMENT

Figure 1:
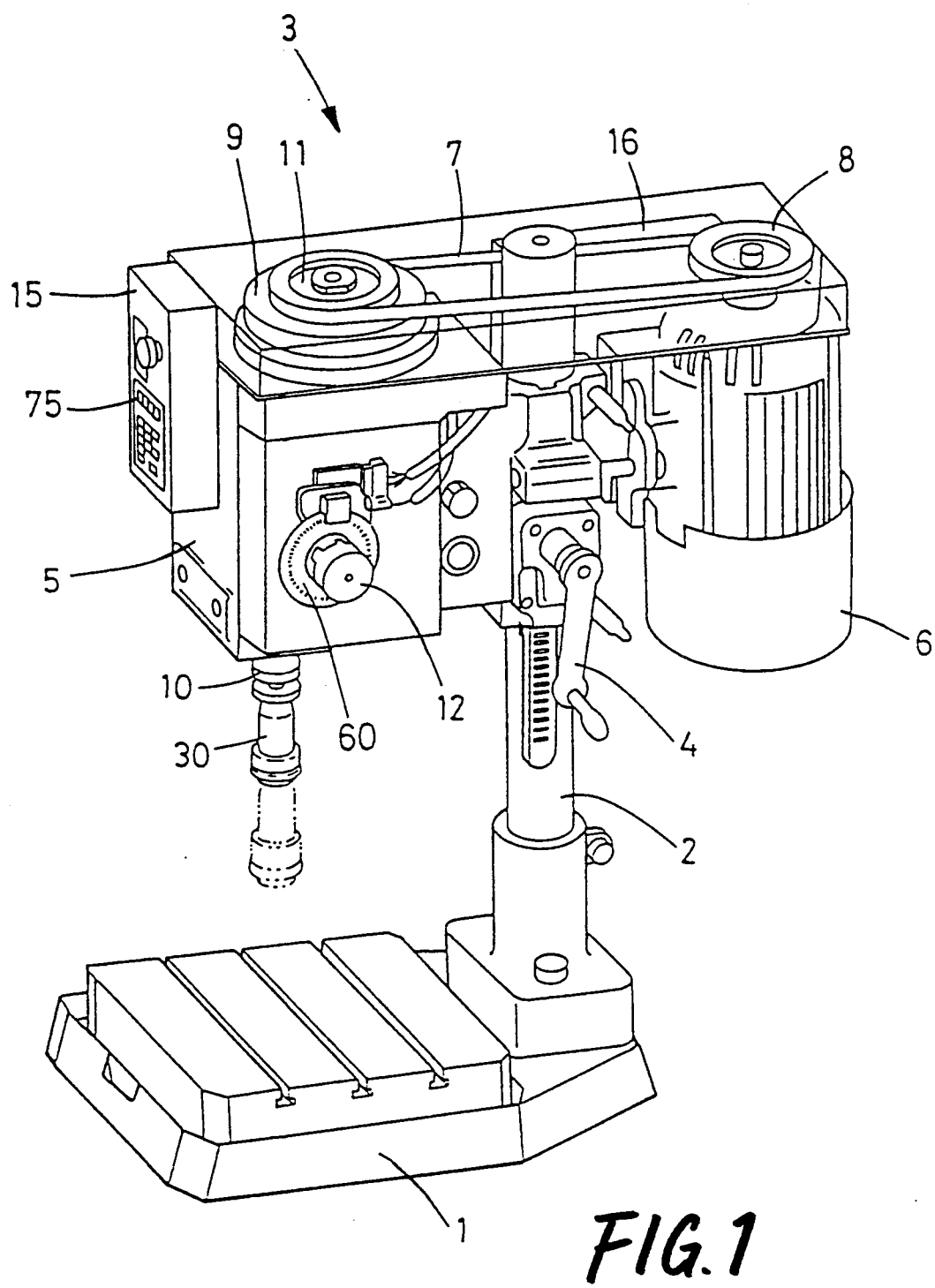
FIG. 1 is a perspective view showing a tapping machine to which the principle of the present invention is applied.

Referring first to FIGS. 1–4, the tapping machine has a column 2 which extends upright from a base 1 and supports a tapping unit generally indicated at 3 in FIG. 1. The tapping unit 3 is vertically positioned on the column 2, by operating a vertical positioning lever 4, and includes a spindle head 5 and a spindle motor 6 for driving the spindle head 5 through a V-belt 7. The spindle motor 6 is a bidirectional variable-speed 4/8-pole pole-change induction motor. The spindle head 5 has a main spindle 10, which is operatively connected to the spindle motor 6 via the V-belt 7, a drive pulley 8, a driven pulley 9 and other power transmission components which will be described. The speed of the main spindle 10 with respect to that of the spindle motor 6 is variable in three steps by changing the V-grooves of the pulleys 8, 9 which engage the V-belt 7. The main spindle 10 has a tap chuck 30 fixed to its free or lower end.

The spindle head 5 incorporates a power transmitting mechanism coupled to the driven pulley 9, which is constructed so that the main spindle 10 is fed in the forward or tapping direction while the spindle motor 6 is rotating in the forward direction, and is fed in the reverse or retracting direction while the motor 6 is rotating in the reverse direction. The feed rate of the spindle 10 or the tapping pitch is determined or changed by first and second change gears 41, 42.

The driven pulley 9 incorporates an overload protective spindle clutch 11 which slips upon application of an excessive torque to the spindle 10 during a tapping operation, to protect the tapping machine from damage due to the overload. The power transmitting mechanism of the spindle head 5 incorporates an overload protective feed clutch 12 which slips to protect the machine when an excessive thrust is applied to the spindle 10 in the axial or feeding direction. Adjacent to the feed clutch 12, there is provided a rotary encoder 60 for detecting the operating position or stroke of the main spindle 10.

The spindle head 5 has an operator's control panel 15 provided on its front side, for the operator to enter necessary tapping data, select the operating mode of the machine, and perform other operations for controlling the machine. The tapping unit 3 has a control console or board 16 provided on its left side, for controlling the spindle motor 6, according to the signals from the operator's control panel 15, rotary encoder 60 and other components. Namely, the control board 16 includes a microcomputer 100 (FIG. 7D) for performing various control operations, such as turning on and off the motor 6 and changing the operating direction and the number of poles of the motor 6.

Figure 2:
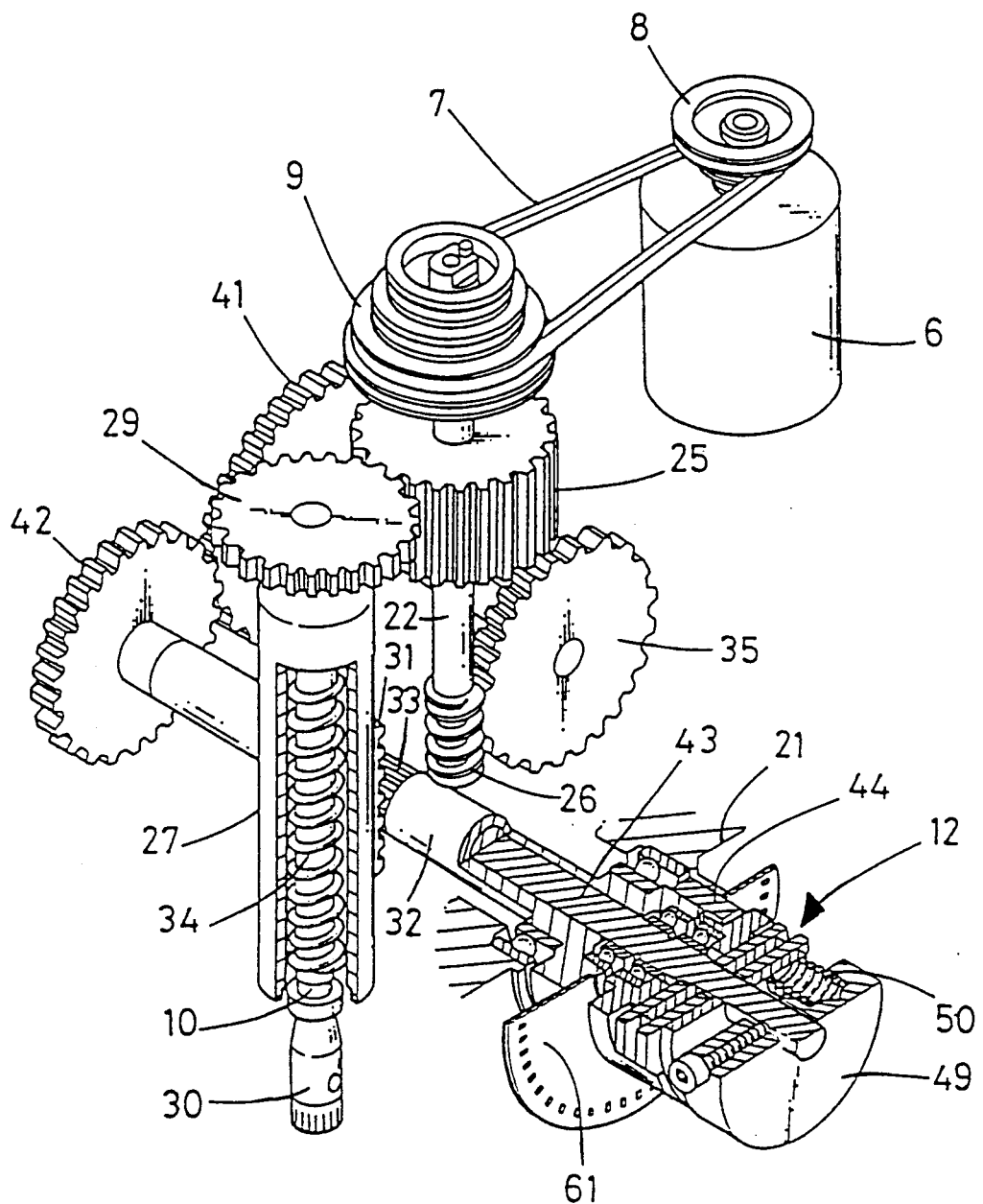
FIG. 2 is a perspective view of a power transmitting mechanism of the tapping machine of FIG. 1.
Figure 3:
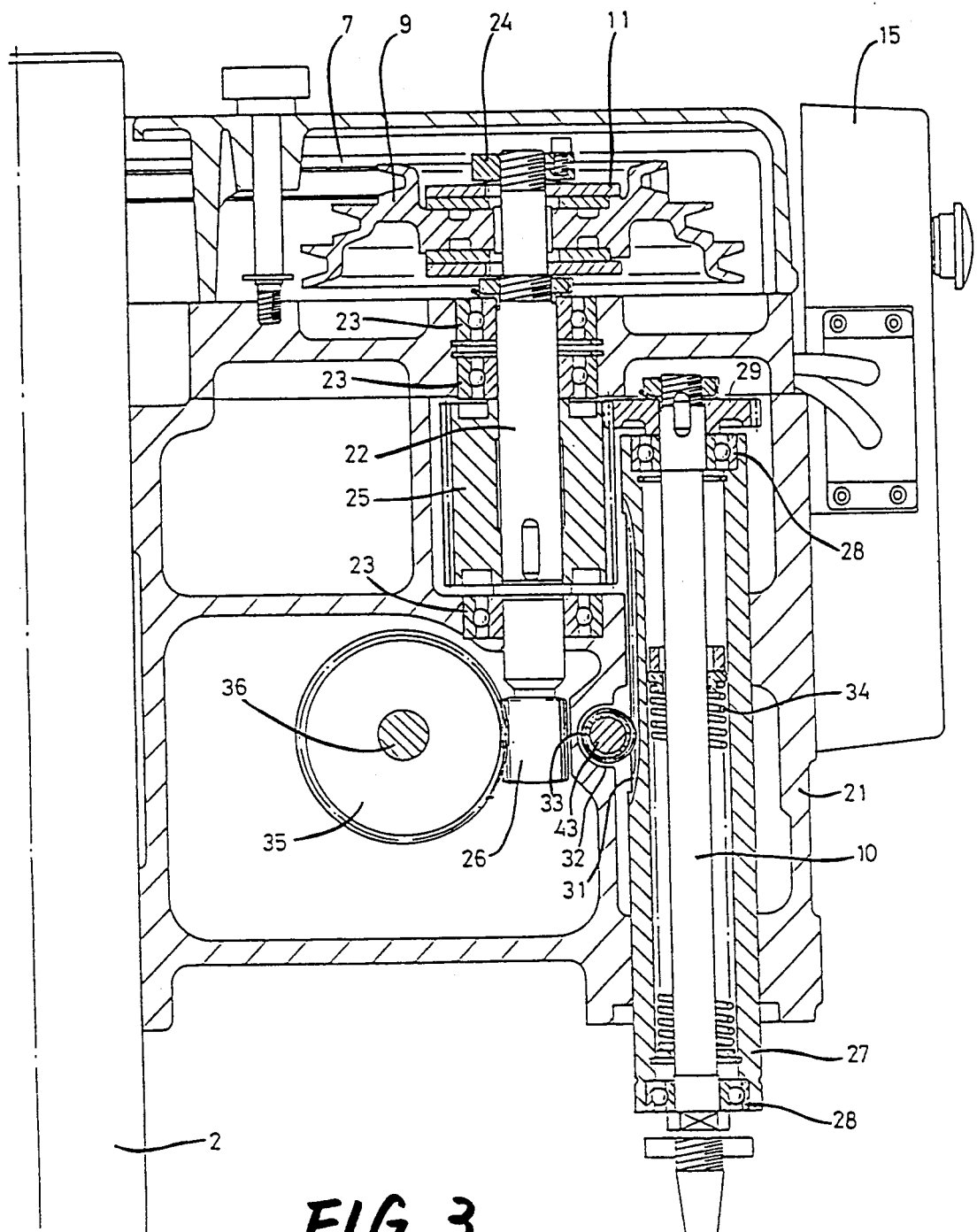
FIG. 3 is an elevational view in vertical cross section of a spindle head of the tapping machine.
Figure 4:
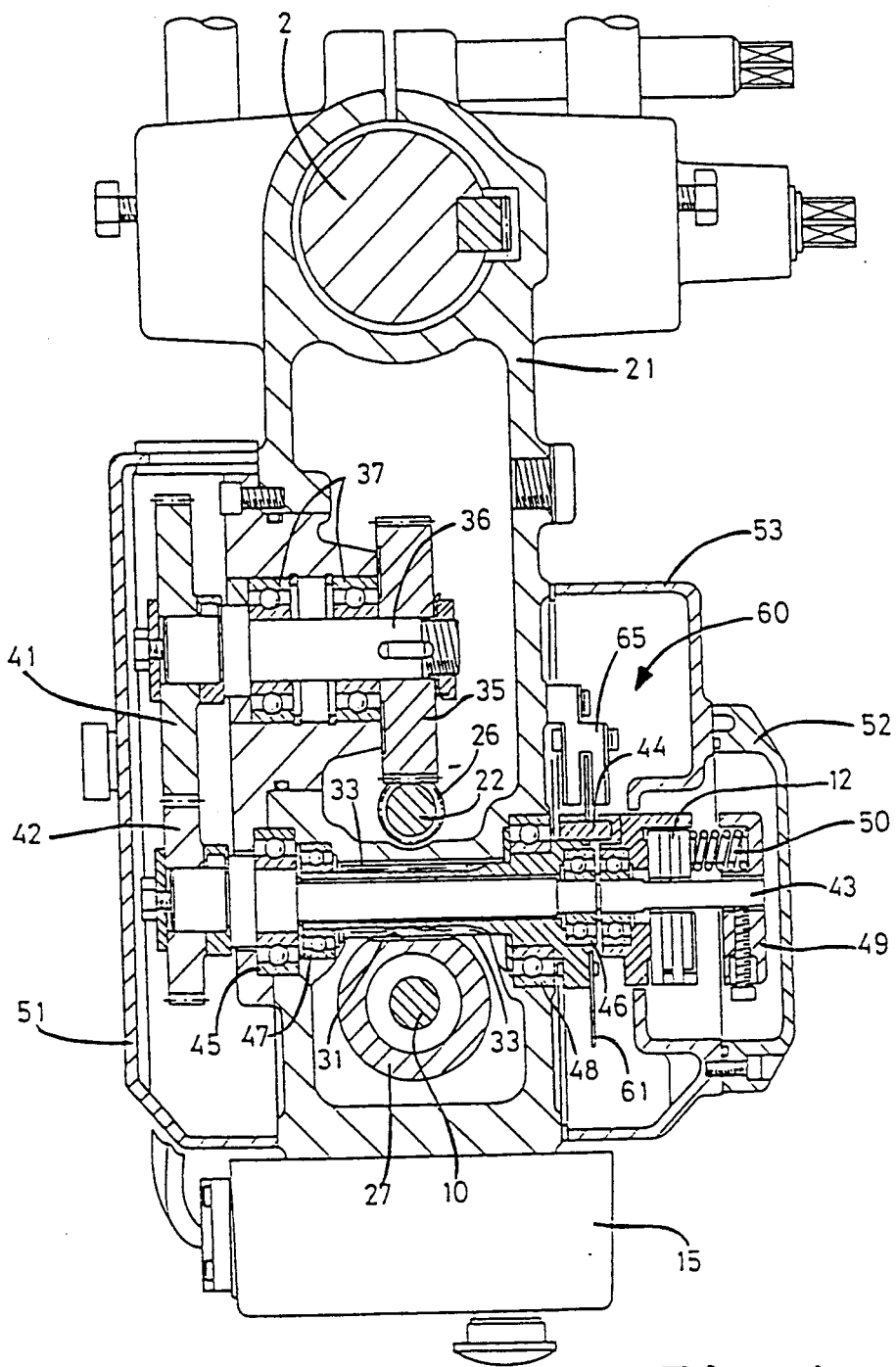
FIG. 4 is a horizontal cross sectional view of the spindle head.

The power transmission mechanism incorporated in the spindle head 5 is illustrated in perspective in FIG. 2, and in vertical and horizontal cross sections in FIGS. 3 and 4, respectively.

The spindle head has a frame 21 by which a drive shaft 22 is rotatably supported in the vertical direction through bearings 23. The driven pulley 9 is attached to the upper end of the drive shaft 22 through the spindle clutch 11. The operating torque of the spindle clutch 11 is adjustable by spindle torque adjusting nut 24. The drive shaft 22 has a main drive gear 25 fixedly mounted thereon at an axially intermediate portion thereof. The drive shaft 22 has a worm 26 formed at the lower end.

The frame 21 also supports a spindle quill 27 such that the quill 27 is vertically movable. The main spindle 10 is rotatably supported within the spindle quill 27 through bearings 28. The spindle quill 27 is not rotatable, and the spindle 10 is rotatable relative to the quill 17 and is vertically reciprocable with the quill 27. The spindle 10 has a spindle drive gear 29 fixed to its upper end, and the gear 29 meshes with the main drive gear 25 so that the spindle 10 is rotated through the gears 25, 29. As indicated above, the spindle 10 is adapted to hold the tap chuck 30 at its lower end, for chucking a tap.

The spindle quill 27 has a rack 31 formed on the outer circumference, so as to extend in the longitudinal direction. The rack 31 engages a pinion 33 formed on a pinion sleeve 32 which is supported by the frame 21 so as to extend in the horizontal direction. The spindle quill 27 is biased by a spring 34 for eliminating a backlash between the rack 31 and the pinion 33.

The worm 26 at the lower end of the drive shaft 22 engages a worm wheel 35 supported by a first rotary shaft 36. This shaft 36 is rotatably supported by the frame 21 through bearings 37, so as to extend in the horizontal direction. The first change gear 41 indicated above is removably fixed to one of the opposite ends of the shaft 36 which projects from the left-hand side wall of the frame 21. The first change gear 41 meshes the second change gear 42 also indicated above, which is removably fixed to the corresponding end of a second rotary shaft 43. This shaft 43 extends through the pinion sleeve 32, such that the end to which the feed clutch 12 is attached projects from the right-hand side wall of the frame 21. A rotary motion of the second rotary shaft 43 is transmitted to the pinion sleeve 32 through the feed clutch 12. The feed clutch 12 is connected to the pinion sleeve 32 by means of a pinion pin 44. The second rotary shaft 43 is supported by the frame 21 through two bearings 45, 46, while the pinion sleeve 32 is supported by the frame 21 through bearings 47, 48. The pinion 33 indicated above is formed on the outer circumferential surface of an axially intermediate portion of the pinion sleeve 32, so that a rotary motion of the pinion sleeve 32 s converted into a linear vertical reciprocating movement of the spindle quill 27, through the mutually engaging pinion 33 and rack 31.

In the power transmission mechanism constructed as described above, the tapping pitch or the feeding distance of the quill 27 per unit angle of rotation of the quill 27 is changed by changing the first and second change gears 41, 42. The operating torque of the feed clutch 12 is adjustable by changing the biasing force of a biasing spring 50, by operating a feed torque adjusting nut 49. The change gears 41, 42 are covered by a cover 51, while the feed clutch 12 is covered by covers 52, 53.

Figure 5:
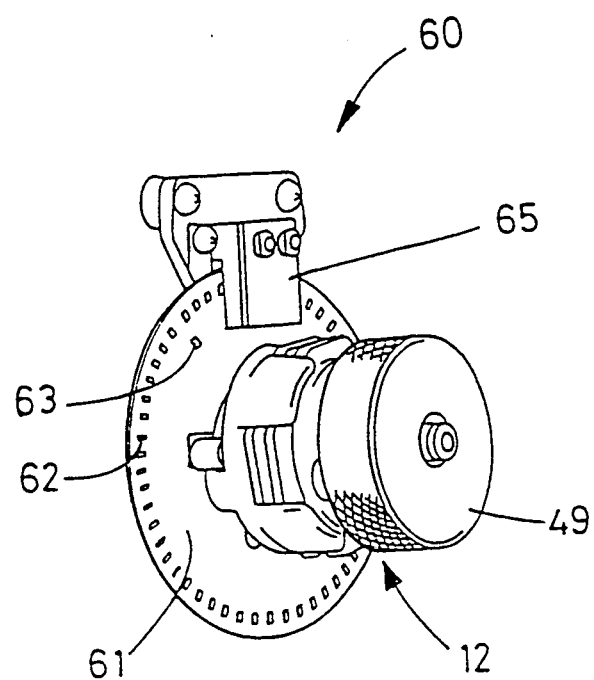
FIG. 5 is a perspective view of a rotary encoder provided on the tapping machine.

The rotary encoder 60 will be described in detail. The encoder 60 includes an encoder disk 61 which is fixed to the end of the pinion sleeve 32 adjacent to the feed clutch 12 on the second rotary shaft 43, as shown in FIG. 2. The encoder disk 61 is rotated with the pinion sleeve 32, which rotates to reciprocate the spindle quill 27. Accordingly, the rotation of the encoder disk 61 represents the position or operating stroke of the quill 27. As shown in FIG. 5, the encoder disk 61 has a multiplicity of apertures 62, which are equally spaced from each other in the circumferential direction of the disk 61. The rotary encoder 60 further includes a photoelectric detector 65 fixed to the frame 21. The detector 65 has three light emitting elements in the form of diodes disposed on one side of the disk 61, and corresponding three photosensors in the form of phototransistors disposed on the other side of the disk 61. The photoelectric detector 65 is adapted to detect the passage of the apertures 62 during rotation of the disk 61. The angular spacing of the apertures 62 is determined so as to correspond to a feeding distance of 0.5 mm of the spindle 10. The encoder disk 61 further has a home-position aperture 63, formed therethrough at a position radially inwardly of the circular array of apertures 62. This home-position aperture 63 is provided to detect the uppermost end or home or original position of the spindle 10. The above-indicated three phototransistors of the photoelectric detector 65 serve as an A-phase sensor 65A, a B-phase sensor 65B and a home-position sensor 65C, as indicated in FIG. 7E. The A-phase and B-phase sensors 65A, 65B, which generate A-phase and B-phase signals (as indicated in FIGS. 9 and 10), respectively, are spaced apart from each other in the circumferential direction of the encoder disk 61, by a circumferential space corresponding to a quarter of the angular spacing of the apertures 62. The A-phase and B-phase signals permit the detection of not only the rotating angle but also the rotating direction of the disk 61, namely, the distance and direction of vertical movement of the spindle quill 27. The home-position sensor 65C is adapted to detect the passage of the home-position aperture 63 for detecting the home position of the spindle quill 27 (spindle 10), as indicated above. Thus, the encoder disk 61 and the photoelectric detector 65 cooperate to constitute the rotary encoder 60.

Figure 6:
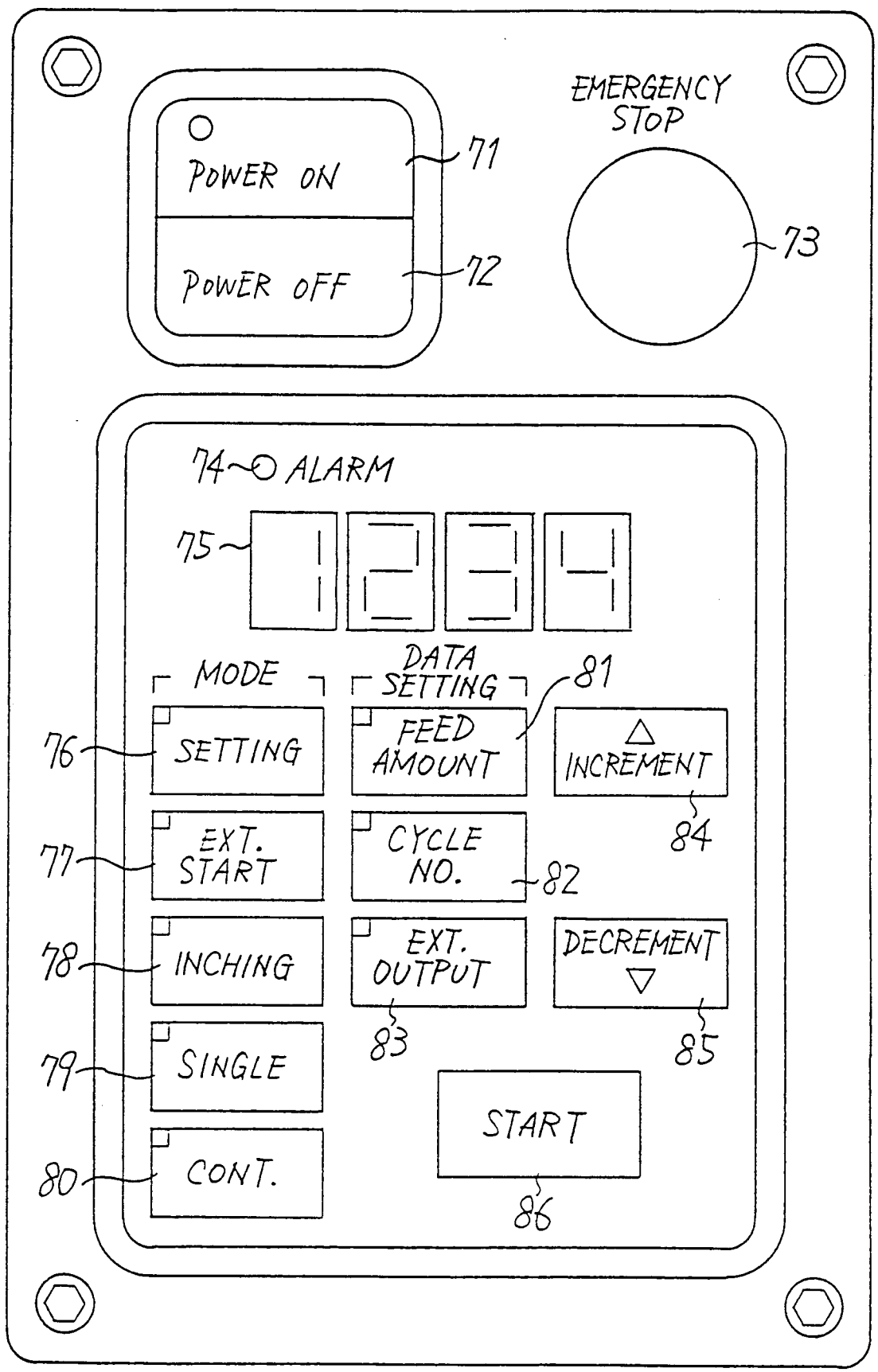
FIG. 6 is a front elevational view of an operator's control panel provided on the machine.

The operator's control panel 15 has various operator's control switches and indicator lights, as shown in the front elevational view of FIG. 6, which includes: POWER ON switch 71 with an indicator light and POWER OFF switch 72, for turning on and off the tapping machine (control board 16); an EMERGENCY STOP switch 73 for stopping a tapping operation and returning the spindle 10 to the home position while rotating it in the reverse direction; an ALARM indicator 74 disposed below the POWER OFF switch 72; four-digit seven-segment DATA display 75 with decimal point lights 75A–75D (FIG. 8), usually used for digitally indicating various sorts of information such as the operating stroke of the spindle 10; MODE selector keys 76–80 with indicator lights; DATA SETTING keys 81–85, the keys 81–83 having respective indicator lights; and a START key 86 for starting an operation of the machine in the mode selected by the selector keys 76–80, according to the data entered through the DATA setting keys 81–85. The DATA display 75 has four alpha-numeric indicator elements which are energized to indicate numerals or alphabetic letters. The decimal point lights 75A–75D of the display 75 are provided near the lower right corner of the respective indicator elements. These lights are selectively illuminated to indicate the position of the decimal point when the operating stroke X of the spindle 10 or quill 27 is indicated on the display 75. The lights 75A–75D are used for inspecting the signals of the encoder 60, as described later in detail.

The MODE selector keys 76–80 are used to select an operating mode of the machine. The keys 76-80 consist of: a DATA SETTING key 76 with an indicator light 76A (FIG. 8), for establishing DATA SETTING mode in which data may be entered; an EXTERNAL START key 77 with an indicator light 77A (FIG. 8), for establishing an EXTERNAL START mode in which the machine is started when a start command is received from a foot-operated start switch or an external device; an INCHING key 78 for establishing an INCHING mode in which the spindle quill 27 is moved with the motor 6 operated as long as or each time the START key 86 is operated, this mode being used for set-up operation; a SINGLE CYCLE key 79 for establishing a SINGLE CYCLE mode in which one tapping cycle is performed each time the START key 86 is operated; and a CONTINUOUS CYCLING key 80 for establishing a CONTINUOUS CYCLING mode in which a tapping cycle is automatically repeated by one operation of the START key 86.

The DATA SETTING keys 81–85 consist of: a FEED AMOUNT key 81 for displaying on the display 75 a preset operating stroke X of the spindle quill 27; a CYCLE NUMBER key 82 for setting a desired number of tapping cycles to be performed in the CONTINUOUS CYCLING mode; an EXTERNAL OUTPUT key 83; an INCREMENT key 84 for incrementing the digital value displayed on the display 75; and a DEC- REMENT key 85 for decrementing the displayed digital value.

Figure 7:
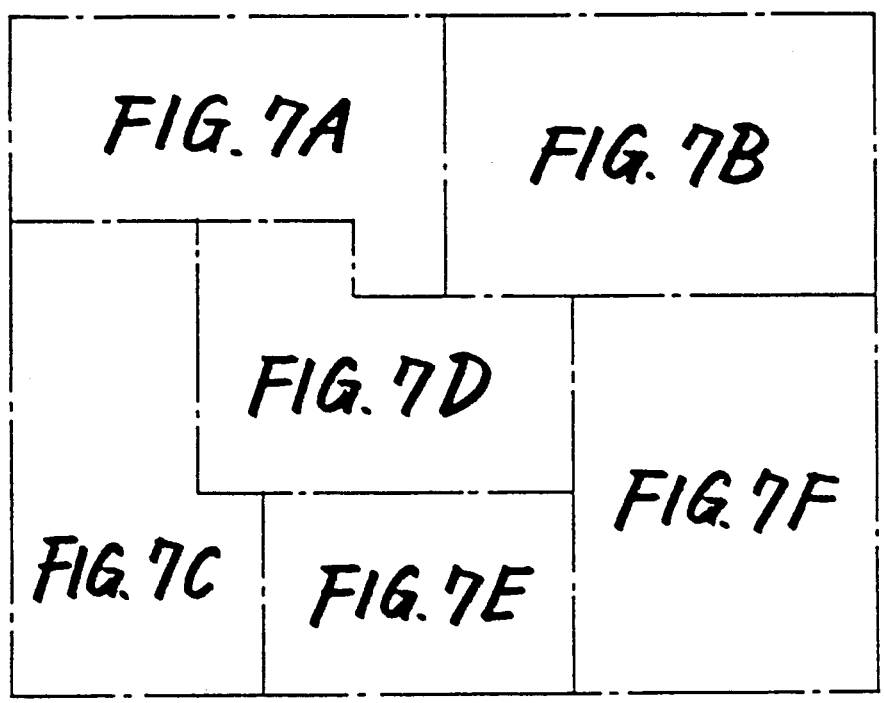
FIG. 7, including
Figure 7B:
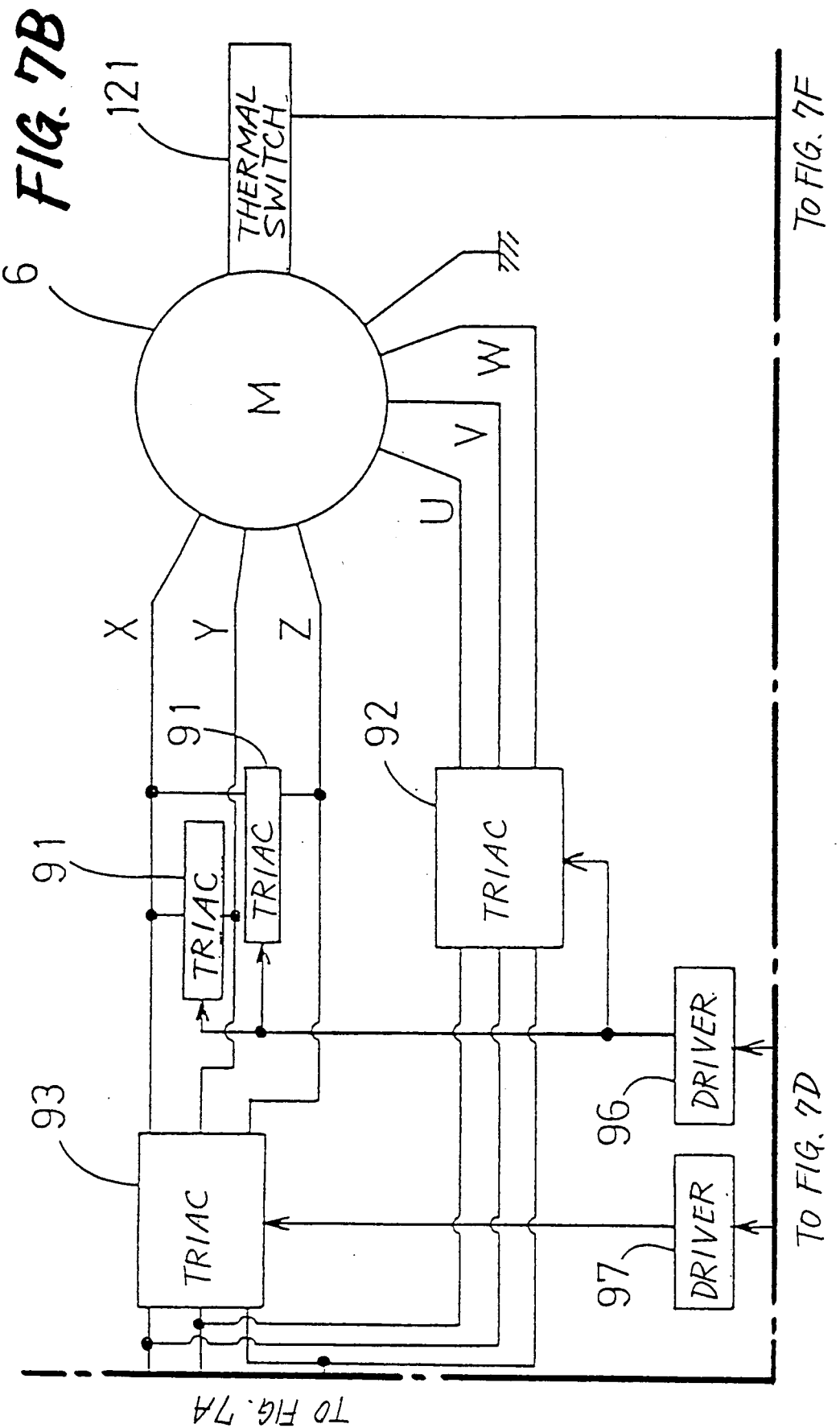
Figure 7C:
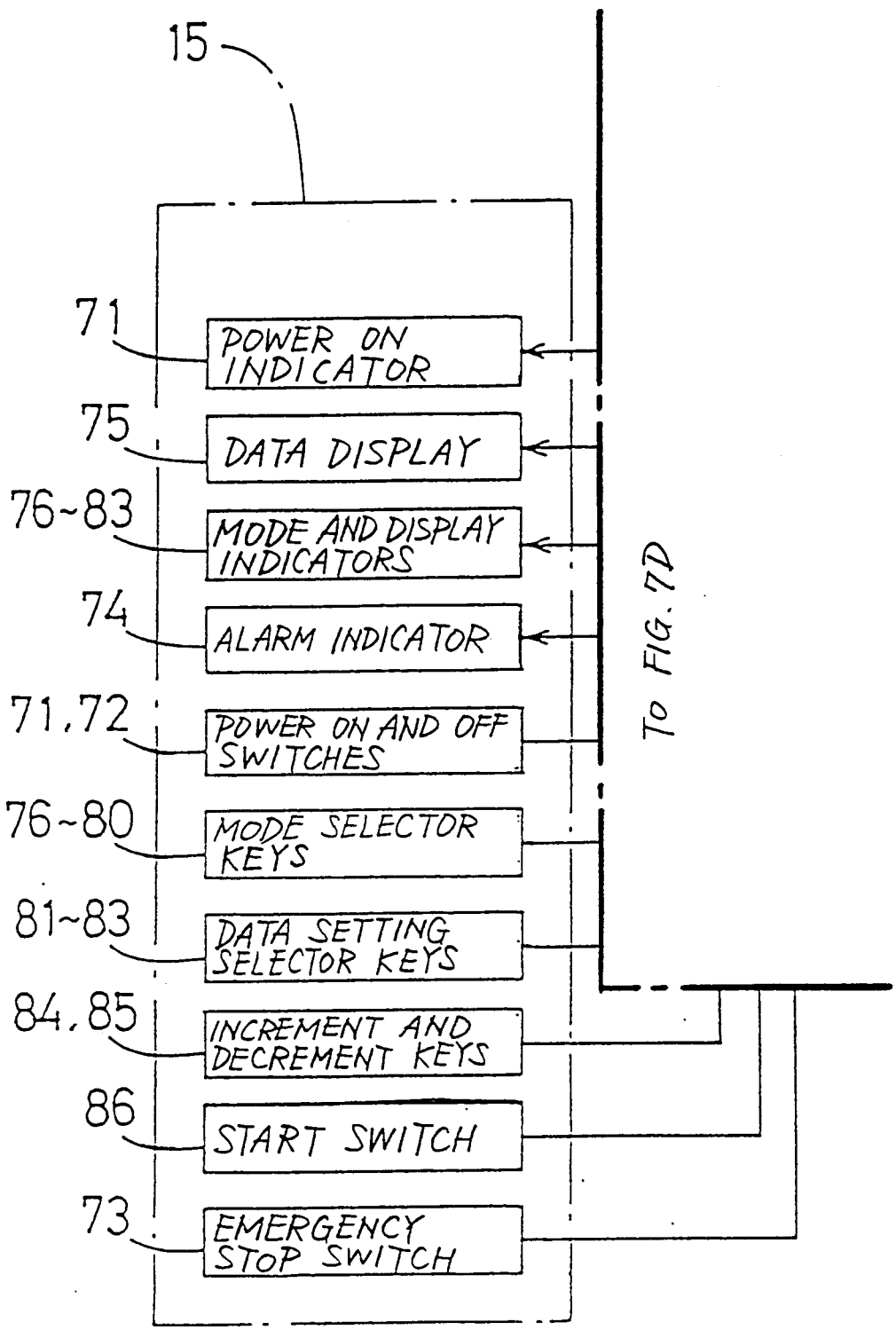
Figure 7E:
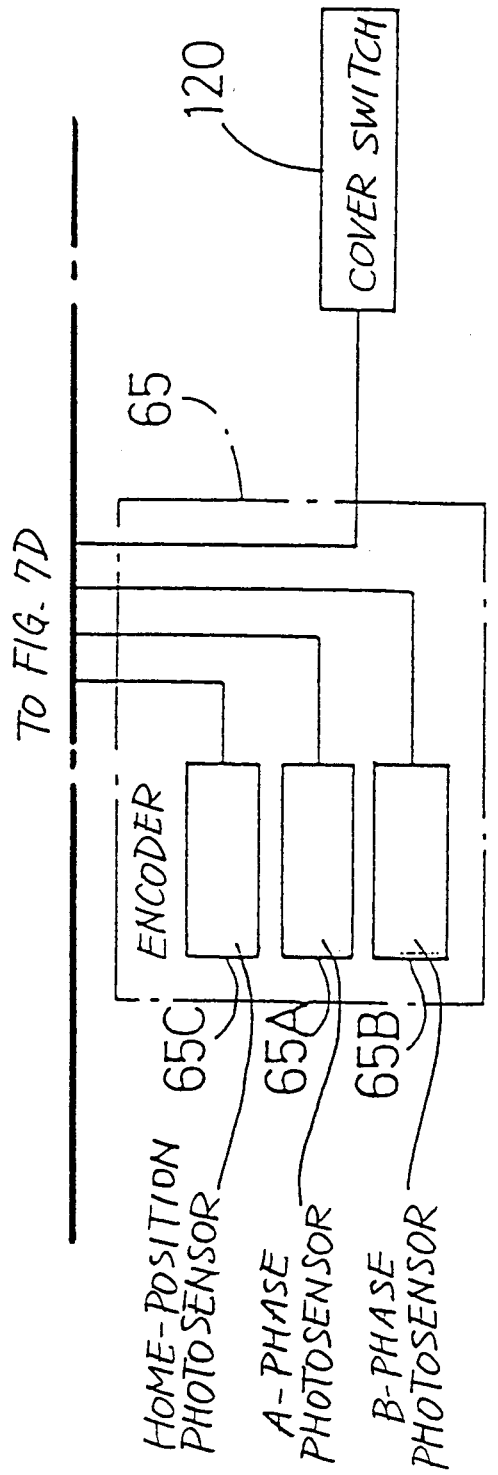

Referring next to the block diagram of FIGS. 7A and 7B, the control apparatus used for the present tapping machine includes triode AC semiconductor switches 91–95 in the form of so-called "triacs", for controlling the bidirectional 4/8-pole pole-change induction motor 6, that is, operating the motor 6 in the forward or reverse direction and effecting a pole changing control of the motor 6. The triacs 91, 92 are used for establishing the 4-pole mode while the triac 93 is used for establishing the 8-pole mode. The triacs 94 and 95 are used for establishing the forward and reverse operating directions of the motor 6, respectively.

The triacs 91–95 are connected through respective drivers 96–99 to the microcomputer 100 (FIG. 7D). The microcomputer 100 has a backup memory 101 for reserving stored data even while power is removed from the machine.

The various components 71–86 provided on the operator's control panel 15 are also connected to the microcomputer 100, so that signals from the switches and keys 71–73 and 76–86 are applied to the microcomputer 100 and so that the indicator light 71, alarm indicator 74, indicator lights 76–83, and DATA display 75 are driven. The photoelectric detector 65 (FIG. 7E) of the rotary encoder 60 is also connected to the microcomputer 100, so that the A-phase and B-phase signals and the home-position signal from the sensors 65A–65C are received by the microcomputer 100. The A-phase and B-phase signals are also applied to a phase difference detecting circuit 102 (FIG. 7D), so that the circuit 102 applies to the microcomputer 100 a direction signal indicative of the direction of operation of the motor 6, or the direction of movement of the spindle quill 27 spindle 10). A pulse counter 103 is provided to count the number of pulses of the A-phase signal, in the incrementing or decrementing direction depending upon the operating direction of the motor 6. The count of the pulse counter 103 is changed upon rising of each A-phase signal pulse, and the signal representative of the count is applied to the microcomputer 100.

The microcomputer 100 receives an EXTERNAL START signal 105 (FIG. 7F) from the foot-operated switch, or external device in the EXTERNAL START mode described above, an EXTERNAL EMERGENCY STOP signal 106 from the external device, and an EXTERNAL HOME-POSITION signal 107 from a limit switch provided on the machine. The EXTERNAL HOME-POSITION signal represents a RETRACT position of the spindle 10 (quill 27) which is different from the original home position detected by the home-position sensor 65C. The microcomputer 100 is connected to signal output circuits 108–111 which generate an EXTERNAL MODE signal 112, a HOME-POSITION signal 113, an EXTERNAL OUTPUT signal 114, and an ALARM signal 115 (FIG. 7F). These signals from the output circuits 108–111 are used to control an indexing table provided on the tapping machine, or other tapping machines.

A cover switch 120 (FIG. 7E) is disposed near the cover 51 covering the change gears 41, 42, so that the switch 120 is closed when the cover 51 is placed in position after the appropriate change gears 41, 42 have been installed. A signal from this cover switch 120 is applied to the microcomputer 100, to inhibit the spindle motor 6 from being energized for safety purpose, when the cover 51 is not installed.

The microcomputer 100 also receives a signal from a protective thermal switch 121 [FIG. 7B] provided for the spindle motor 6, for detecting the overheating of the motor 6. The control apparatus uses DC power circuits 122–124 (FIG. 7A) for supplying power to the drivers 96–99.

The microcomputer 100 determines the position of the spindle quill 27 (spindle 10), according to the A-phase and B-phase signals from the sensors 65A, 65B of the photoelectric detector 65 of the rotary encoder 60 and the count of the pulse counter 103, and applies the drive signals to the drivers 96–99 according to the data entered through the operator's control panel 15, to control the spindle motor 6 in the selected mode.

In the SINGLE CYCLE mode selected by the SINGLE CYCLE key 79, a standard tapping cycle is performed. Upon activation of the START key 86, the spindle motor 6 is started to operate in the forward direction, causing the spindle 10 to be fed in the forward direction for tapping over a predetermined distance. When the count of the pulse counter 103 reaches the predetermined number corresponding to the predetermined forward feeding distance, the spindle motor 6 is reversed, to retract the spindle 10 to the home position of the machine.

There will be described a procedure for inspecting the encoder 60 for adjustment of the mounting position.

Initially, the EMERGENCY STOP switch 73 on the operator's control panel 15 is activated, to return the spindle quill 27 to the home position. Then, the DATA SETTING key 76 and the EXTERNAL START key 77 are concurrently pressed, whereby the microcomputer 100 is placed in an ENCODER SIGNAL DISPLAY mode. As a result, the indicator lights 76A and 77A of the keys 76, 77 are illuminated to inform the operator that the microcomputer 100 is placed in the ENCODER SIGNAL DISPLAY mode. At the same time, the DATA display 75 is placed in the reset state with no data displayed thereon. If the A-phase signal is normally generated from the A-phase sensor 65A of the encoder 60, the decimal point light 75A corresponding to the fourth digit of the display 75 is illuminated. Similarly, the decimal point light 75B and 75C corresponding to the third and second digits of the display 75 are illuminated if the B-phase signal and home-position signal are normally generated from the B-phase sensor 65B and home-position sensor 65C, respectively. The decimal point light 75D corresponding to the first digit of the display 75 is held off. Accordingly, the decimal point lights 75A and 75C indicative of the A-phase and home-position signals of the encoder 60 should be illuminated when the quill 27 is positioned at the home position, if the encoder 60 is in the normal condition.

For closer inspection of the signals of the encoder 60, the illumination of the lights 75A, 75B and 75C is examined while the driven pulley 9 is rotated by hand. When the spindle quill 27 is moved off the home position, the decimal point light 75C indicative of the presence of the home-position signal from the home-position sensor 65C is turned off. As the quill 27 is moved by rotating the pulley 9, the lights 75A and 75B indicative of the presence of the A-phase and B-phase signals are alternately turned on and off. While the quill 27 is advanced (while the motor 6 is rotated in the forward direction), the pulses of the A-phase signal precede those of the B-phase signal, as indicated in FIG. 9. On the other hand, the pulses of the B-phase signal precede those of the A-phase signal, as indicated in FIG. 10, while the quill 27 is retracted (while the motor 6 is rotated in the reverse direction).

Thus, by simultaneously operating the DATA SETTING and EXTERNAL OUTPUT keys 76, 77, the generation of the signals from the encoder 60 can be visually inspected by observing the decimal point lights 75A, 75B and 75C of the DATA display 75 on the operator's control panel 15 while rotating the pulley 9 to move the quill 27.

The covers 52, 53 covering the encoder 60 are removed only if the lights 75A, 75B and 75C on the control panel 15 indicate any abnormality in connection with the signals of the encoder 60. If the B-phase signal is not generated from the B-phase sensor 65B of the photoelectric detector 65, for example, the detector 65 is cleaned to remove possibly deposited oil or dust. If the A-phase and home-position signals of the sensors 65A and 65C are both absent while the quill 27 is in the home position, the fixing screws for the detector 65 are loosened, and the mounting position of the detector 65 is adjusted so that the decimal point lights 75A and 75C on the display 75 are illuminated. In this respect, the positional adjustment of the detector 65 during manufacture or maintenance service of the machine is facilitated by the operating states of the lights 75A-75C.

Figure 11:
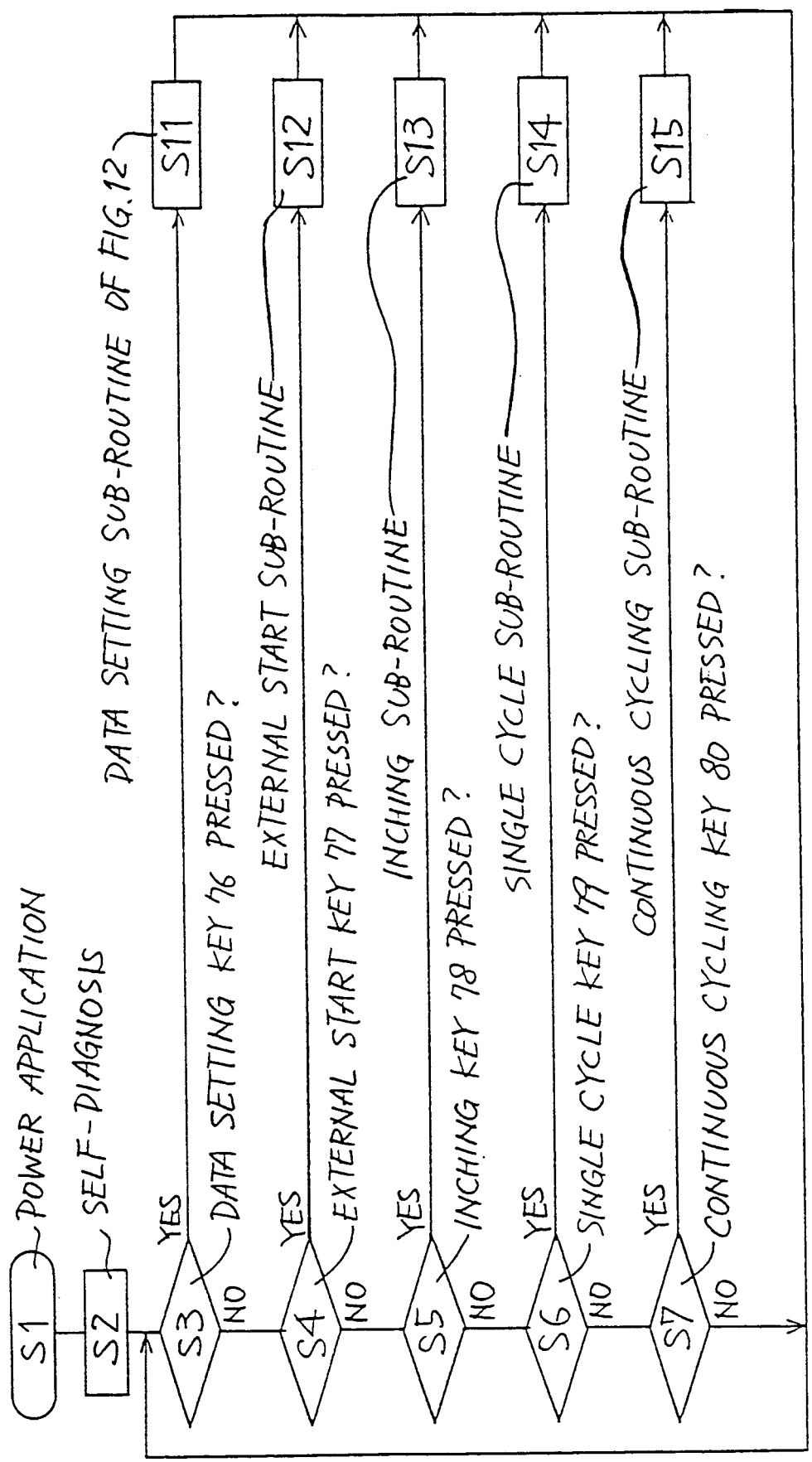

Referring to the flow chart of FIG. 11, there is illustrated a main control routine of the microcomputer 100. After the application of power to the machine in step S1, the control flow goes to step S2 to perform self-diagnostic and initializing operations, such as reading of the sensor signals (e.g., signal from the cover switch 120, and A-phase and home-position signals from the sensors 65A and 65C), checking of the data stored in the memories of the microcomputer 100, and activation of the indicator lights on the control panel 15. Then, the control flow goes to steps S3-S7 to determine whether any one of the MODE selector keys 76-80 is pressed, or not. If the DATA SETTING key 76 is pressed, step S3 is followed by step S11 to execute a data setting sub-routine of FIG. 12, with the microcomputer 100 placed in the DATA SETTING mode. If the EXTERNAL START key 77 is pressed, step S4 is followed by step S12 to execute an external start sub-routine, with the microcomputer 100 placed in the EXTERNAL START mode. If the INCHING key 78 is operated, step S5 is followed by step S13 to execute an inching sub-routine, with the microcomputer 100 placed in the INCHING mode. If the SINGLE CYCLE key 79 is operated, step S6 is followed by step S14 to execute a single cycle sub-routine, with the microcomputer 100 placed in the SINGLE CYCLE mode. If the CONTINUOUS CYCLING key 80 is operated, step S7 is followed by step S15 to execute a continuous cycling sub-routine, with the microcomputer 100 placed in the CONTINUOUS CYCLING mode.

When the inspection and adjustment of the encoder 60 is effected, the DATA SETTING key 76 is pressed together with the EXTERNAL START key 77 as indicated above, whereby the control flow goes from step S3 to step S11. That is, the data setting sub-routine is implemented.

When the control flow goes to the data setting sub-routine of step S11 of the main routine, the microcomputer 100 is placed in the DATA SETTING mode, and the indicator light of the DATA SETTING key 76 is illuminated. In the data-setting sub-routine S11, steps S21, S22 and S23 are initially executed to determine whether the FEED AMOUNT key 81, CYCLE NUMBER key 82 or EXTERNAL OUTPUT key 83 is pressed. If the key 81 is pressed, step S21 is followed by step S31 to set the operating stroke X. If the key 82 is pressed, step S22 is followed by step S32 to set the number of tapping cycles. If the key 83 is pressed, step S23 is followed by step S33 to set the external output data for controlling an external device or other tapping machines. If a negative decision (NO) is obtained in steps S21-23, the control flow goes to step S24 to determine whether the DATA SETTING, INCREMENT and DECREMENT keys 76, 84, 85 are concurrently held pressed for three seconds or more. If an affirmative decision (YES) is obtained in step S24, step S34 is implemented to establish a SPECIAL DATA SETTING mode for executing a special data setting sub-routine to effect special data setting operations. These operations are not important to understand the principle of the present invention. If a negative decision (NO) is obtained in step S24, step S25 is implemented to determine whether the DATA SETTING and EXTERNAL START keys 76, 77 are concurrently pressed. In an affirmative decision (YES) is obtained in step S25, the control flow goes to step S35 to establish the ENCODER SIGNAL DISPLAY mode, for executing an encoder signal display sub-routine to check the signals generated by the encoder 60.

If a negative decision (NO) is obtained in all of the steps S21-S25, step S26 is implemented to determine whether one of the EXTERNAL START, INCHING, SINGLE CYCLE and CONTINUOUS CYCLING keys 77-80 is operated. If any one of the MODE selector keys 77-80 is operated, the control flow goes to step S27 to return to the main routine of FIG. 11, and the corresponding sub-routine of step S12, S13, S14, S15 is implemented.

When the signals of the encoder 60 are inspected, the DATA SETTING and EXTERNAL START keys 76, 77 are concurrently pressed, whereby step S25 is followed by step S35 to execute the encoder signal display sub-routine.

Figure 12:
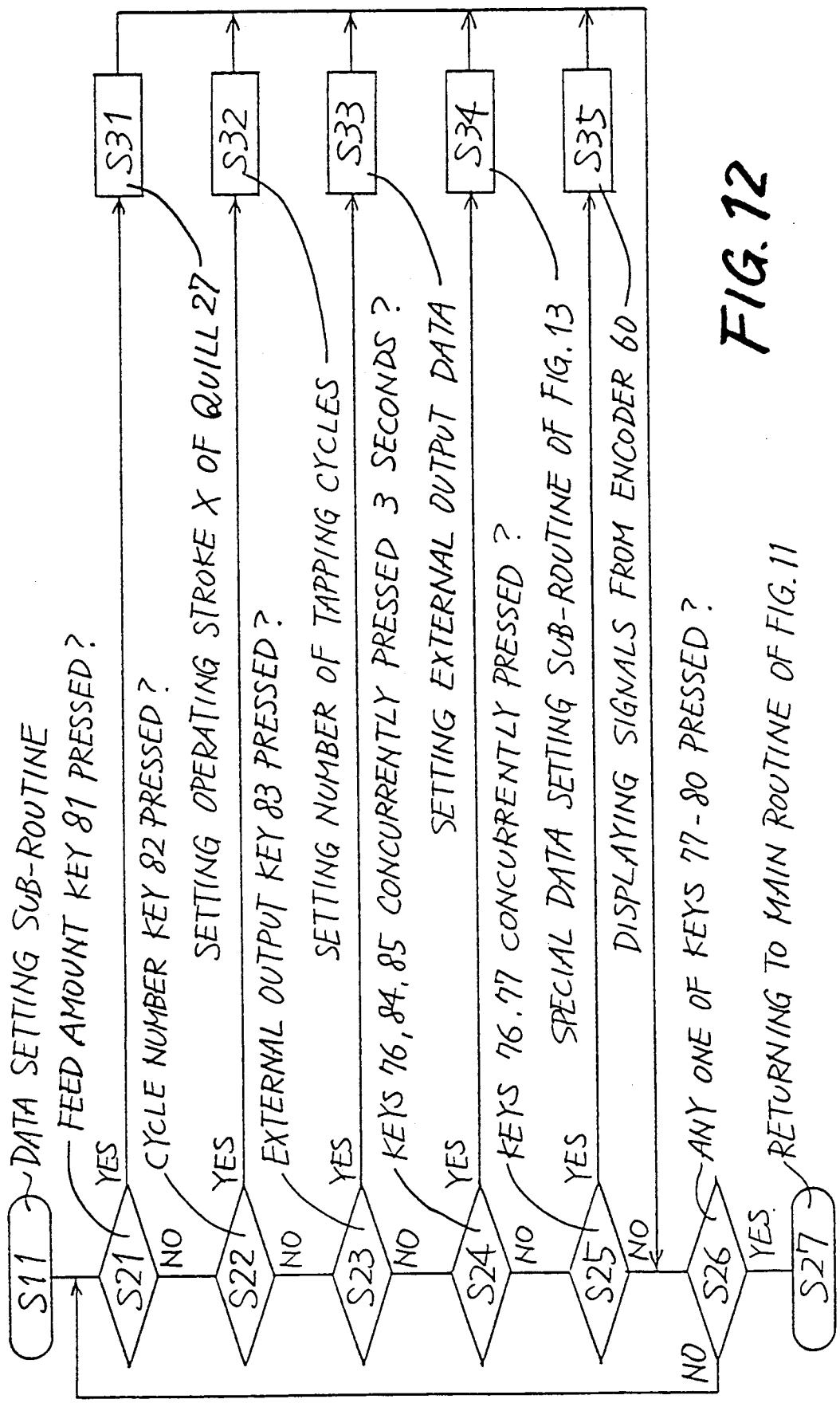

The encoder signal display sub-routine in step S35 of FIG. 12 is illustrated in the flow chart of FIG. 13. In this sub-routine, step S351 is initially executed to receive the A-phase, B-phase and home-position signals from the respective sensors 65A, 65B, 65C of the photoelectric detector 65 of the encoder 60. Step S351 is followed by step S352 in which the decimal point lights 75A, 75B, 75C of the DATA display 75 are illuminated or remain off, depending upon the levels (high or low) of the signals of the encoder 60, whereby the signals of the encoder 60 can be inspected.

Steps S351 and S352 are repeatedly executed until any one of the keys 76-86 is operated. If an affirmative decision (YES) is obtained in step S353, the control flow goes to step S26 of the data setting sub-routine of FIG. 12.

While the present embodiment of the control apparatus of the invention has been described, as applied to a tapping machine, the principle of the present invention is equally applicable to the regulation of the operating stroke of a reciprocating member of any other machine tool such as a drilling machine or to the regulation of the operating stroke of a carriage of an office instrument or bussiness machine.

Although the present invention has been described in its presently preferred embodiment with a certain degree of particularity, it is to be understood that the invention is not limited to the details of the illustrated embodiment, but may be embodied with various changes, modifications and improvements, which may occur to those skilled in the art, without departing from the spirit and scope of the invention defined in the following claims.

What is claimed is:

1. An apparatus for controlling a reciprocating movement of a reciprocating member adapted to be reciprocated over a predetermined operating stroke by forward and reverse rotations of a drive motor, said apparatus comprising:

an encoder for generating pulses each of which corresponds to an incremental distance of movement of said reciprocating member;

an operator's control panel having a plurality of operator's control switches for entering data and commands for controlling said drive motor, and a data display normally placed in a data display mode for displaying information which includes data relating to movement of said reciprocating member;

motor control means for controlling said drive motor according to the data entered through said control switches and said pulses generated by said encoder;

detecting means for detecting a specific command generated by at least one of said plurality of control switches on said operator's control panel; and display control means responsive to said specific command detected by said detecting means, for placing said data display in an inspection mode for providing an indication as to whether said pulses of said encoder are present or not.

2. An apparatus according to claim 1, wherein said operator's control panel generates said specific command when a plurality of switches of said plurality of operator's control switches are concurrently operated.

3. An apparatus according to claim 2, wherein said plurality of operator's control switches comprise a plurality of mode selector switches which include a data setting selector key for establishing a data setting mode for entering data which includes data representative of said predetermined operating stroke, said plurality of switches to be concurrently operated generating said specific command when said plurality of switches are operated in said data setting mode.

4. An apparatus according to claim 3, wherein said plurality of switches to be concurrently operated include said data setting selector key.

5. An apparatus according to claim 1, wherein said operator's control panel generates said specific command when a plurality of switches of said plurality of operator's control switches are concurrently operated for at least a predetermined length of time.

6. An apparatus according to claim 5, wherein said predetermined length of time is at least three seconds.

7. An apparatus according to claim 1, wherein said data display includes a plurality of alpha-numeric indicator elements which are operable in said data display mode, and a plurality of indicator lights corresponding to said alpha-numeric indicator elements, said indicator lights being selectively illuminated to indicate a position of a decimal point when a numerical value is indicated by said alpha-numeric indicator elements in said data display mode.

8. An apparatus according to claim 7, wherein said display control means controls at least one of said indicator lights of said data display in said inspection mode, such that said at least one indicator light is turned on and off depending upon whether said pulses generated by said encoder are present or not.

9. An apparatus according to claim 8, wherein said encoder generates an A-phase signal and a B-phase signal which have a same pulse interval corresponding to said incremental distance of movement of said reciprocating member and whose phases are shifted from each other, and a home-position signal which is generated when said reciprocating member is located at a home position thereof which defines one end of said predetermined operating stroke, said display control means controlling three lights of said plurality of indicator lights of said data display in said inspection mode, said three lights corresponding to said A-phase, B-phase and home-position signals generated by said encoder.

10. An apparatus according to claim 1, wherein said reciprocating member comprises a spindle for holding a tapping tool, said spindle being rotatably supported by a reciprocable spindle quill operatively connected to said drive motor.

11. An apparatus for controlling a reciprocating movement of a reciprocating member adapted to be reciprocated over a predetermined operating stroke by forward and reverse rotations of a drive motor, said apparatus comprising:

an encoder for generating at least two pulse signals at least one of which has a pulse interval corresponding to an incremental distance of movement of said reciprocating member;

an operator's control panel having a plurality of operator's control switches for entering data and commands for controlling said drive motor, and a data display normally operable in a data display mode for displaying information which includes data relating to a movement of said reciprocating member;

motor control means for controlling said drive motor according to the data entered through said control switches and said at least two pulse signals generated by said encoder;

detecting means for detecting a specific command generated by at least one of said plurality of control switches; and display control means responsive to said specific command detected by said detecting means, for placing said data display in an inspection mode for providing an indication as to whether said at least two pulse signals are present or not, respectively.

12. An apparatus according to claim 11, wherein said data display has a plurality of alpha-numeric indicator elements and a plurality of indicator lights corresponding to said indicator elements, said plurality of indicator lights being selectively turned on to indicate a position of a decimal point when a numerical value is indicated by said indicator elements in said data display mode, at least two of said plurality of indicator lights being turned on and off in said inspection mode, for providing an indication as to whether said at least two pulse signals are present or not, respectively.

13. An apparatus according to claim 12, wherein said encoder generates, as said at least two pulse signals, an A-phase signal and a B-phase signal which have a same pulse interval corresponding to said incremental distance of movement of said reciprocating member and whose phases are shifted from each other, and a home-position signal which is generated when said reciprocating member is located at a home position thereof which defines one end of said predetermined operating stroke, said display control means controlling three lights of said plurality of indicator lights in said inspection mode, such that said three lights indicate the presence or absence of said A-phase, B-phase and home-position signals.

* * * * *